US005711842A

United States Patent [19]
Kemmish

[11] Patent Number: 5,711,842
[45] Date of Patent: Jan. 27, 1998

[54] ADHESION PROCESS

[75] Inventor: David John Kemmish, Nr Preston, United Kingdom

[73] Assignee: Zeneca Limited, London, England

[21] Appl. No.: 591,558

[22] PCT Filed: Jul. 11, 1994

[86] PCT No.: PCT/GB94/01496

§ 371 Date: Apr. 19, 1996

§ 102(e) Date: Apr. 19, 1996

[87] PCT Pub. No.: WO95/02649

PCT Pub. Date: Jan. 26, 1995

[30] Foreign Application Priority Data

Jul. 14, 1993 [GB] United Kingdom ............... 9314577

[51] Int. Cl.⁶ ..................................... C09J 4/00
[52] U.S. Cl. ..................... 156/332; 524/599; 528/361
[58] Field of Search .................. 524/599; 528/361; 156/332

[56] References Cited

U.S. PATENT DOCUMENTS 5,169,889 12/1992 Kauffman et al. .

FOREIGN PATENT DOCUMENTS 3-260174 11/1991 Japan ............................... 156/332

*Primary Examiner*—John J. Gallagher
*Attorney, Agent, or Firm*—Cushman Darby & Cushman Intellectual Property Group Of Pillsbury Madison & Sutro LLP

[57] ABSTRACT

A process of bonding two or more articles together using an adhesive composition comprising at least one polyhydroxyalkanoate (PHA) wherein the PHA is placed between the articles to be bonded and the articles are subjected to pressure to set the adhesive, optionally at elevated temperatures.

7 Claims, No Drawings

ADHESION PROCESS

This application claims benefit of international application PCT/GB94/01496, filed Jul. 11, 1994.

THIS INVENTION relates to an adhesion process. More particularly it relates to a process of bonding articles together with an adhesive comprising a biodegradable polymer.

It is known to coat paper with polyhydroxyalkanoic acids (PHA), for example polymers of hydroxybutyric acid (PHB) and copolymers with hydroxyvaleric acid (PHBV) both as latex and as dry solid, preferably as dry powder. The coating is biodegradable but is non-adhesive.

We have now found that articles may be stuck together using PHA as an adhesive under cold application conditions and setting it with both articles in contact with one another under pressure and preferably with heat. The adhesive is biodegradable. The adhesive is believed to set by crystallisation.

Thus, according to the present invention there is provided a process of bonding two or more articles together using an adhesive composition comprising at least one polyhydroxyalkanoate (PHA) wherein the PHA is placed between the articles to be bonded and the articles are subjected to pressure to set the adhesive, optionally at elevated temperature.

The PHA is especially one capable of a relatively high level of crystallinity, for example over 30%, especially 50–90%, in the absence of plasticiser. Suitably it is or includes at least one microbiologically produced polyester having units of formula I:

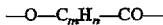

$$-O-C_mH_n-CO-\qquad\qquad I$$

where m is in the range 1–13 and n is 2 m or (if m is at least 2) 2 m–2. Typically $C_mH_n$ contains 2–5 carbon atoms in the polymer chain and the remainder (if any) in a side chain. In very suitable polyesters n is 2 m and there are preferably units with m=3 and m=4 copolymerised together and with respectively a $C_1$ and $C_2$ side chain on the carbon next to oxygen in the chain. The polymer may be homopolymer, especially a polyhydroxybutyrate (PHB), or a copolymer, especially a copolymer of hydroxybutyric acid and hydroxyvaleric acid (HV) containing preferably 4–30 mol % of m=4 units. Thus, particular polyesters contain a preponderance of m=3 units, especially with 70–98 mol % of such units, the balance (if any) being units in which m=4. The molecular weight of the PHA is preferably over 50000, especially over 100000, up to e.g. $2\times10^6$.

The PHA may be a blend of two or more copolymers differing in the value of m. A particular example contains (a) PHA consisting essentially of Formula I units in which 2–5 mol % of units have m=4, the rest m=3; and (b) PHA consisting essentially of Formula I units in which 5–30 mol % of units have m=4, the rest m=3.

In each such PHA there are preferably side chains as above mentioned. The proportions in such a blend are preferably such as give an average m=4 content in the range 4–30, more preferably 10–28, mol %.

In each such PHA having units with m=3 and m=4 there may be very small, typically fractional, percentages of units having higher values of m.

Typically the composition contains microbiologically produced PHA to the extent of over 50, especially over 80,% w/w.

The PHA is preferably a fermentation product, especially of a microbiological process in which a microorganism lays down PHA during normal growth or is caused to do so by cultivation in the absence of one or more nutrients necessary for cell multiplication. The microorganism may be wild or mutated or may have had the necessary genetic material introduced into it. Alternatively the necessary genetic material may be harboured by a eukariote, to effect the microbiological process.

Examples of suitable microbiological processes are the following:

for Formula I material with m=3 or m=partly 3, partly 4: EP-A-69497 (*Alcaligenes eutrophus*);

for Formula I material with m=3: U.S. Pat. No. 4,101,533 (*A. eutrophus* H-16), EP-A-144017 (*A. latus*);

for Formula I material with m=7–13: EP-A-0392687 (various *Pseudomonas sp.*).

The PHA can be extracted from the fermentation product cells by means of an organic solvent, or the cellular protein material may be decomposed leaving small granules of polymer for example of which less than 10% have diameters greater than 1 micrometres. For specialised end uses the cellular protein may be partly or wholly allowed to remain with the PHA, but preferably subjected to cell breakage.

Alternately, the PHB or PHBV can be a product of synthetic chemistry (Bloembergen and Holden, Macromolecules 1989, 22, p1656–1663. Bloembergen, Holden, Bluhm, Hamer and Marchessault, Macromolecules 1989, 22, p1663–1669).

The PHA may contain one or more nucleants, for example, boron nitride.

The PHA may optionally contain a variety of additives making it suitable for a range of applications. Such additives include tackifiers, waxes, plasticisers, stabilizers or antioxidants and compatible thermoplastic polymers. It is an advantage of the invention that good results can be obtained in the absence of tackifier.

The adhesive composition preferably contains 20 to 99% by weight of PHB or the copolymer PHBV, particularly 50 to 95%, especially 50 to 90%.

If a tackifier is present, the composition preferably contains 5 to 80% w/w thereof. Examples of suitable tackifiers include rosin and rosin derivatives, terpene phenolics and pure phenolic resins; and more specifically, gum rosin, wood rosin, tall oil rosin, distilled rosin, hydrogenated rosin, dimerized rosin, polymerised rosin, glycerol-, or pentaerythritol- esters of natural and modified rosins, such as for example wood rosin, the glycerol- or pentaerythritol-ester of hydrogenated rosin, the phenolic-modified pentaerythritol ester of rosin, phenolic modified terpene resins and hydrogenated derivatives thereof, and thermoplastic alkyl phenolic resins such as those described in U.S. Pat. No. 4,073,776 and U.S. Pat. No. 4,023,826.

A combination of two or more of the above mentioned tackifers may be used if suitable.

If a wax diluent is present, the composition preferably comprises 1 to 30% w/w thereof. Suitable examples are 12-hydroxystearamide wax, hydrogenated castor oil, oxidized synthetic waxes and polyethylene oxide.

If a stabilizer is present the composition preferably contains 0.1–4% w/w thereof. Suitable examples are high molecular weight phenols and multifunctional phenols such as sulphur and phosphorus-containing phenols, for example, 1,3,5-trimethyl-2,4,6-tris-(3,5-di-tert-butyl-4-hydroxybenzyl)benzene; pentaerythritol tetrakis-3-(3,5-di-tert-butyl-4-hydroxyphenyl)-propionate; n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n- octyl-thio)-1,3,5-triazine; di-n-octadecyl- 3,5 di-tert-butyl-4-hydroxybenzylphosphonate; 2-(n-octyl-thio) ethyl-3,5-di-tert-butyl-4-hydroxy-benzoate; and sorbitol hexa[3-(3,5-di-tert-butyl-4-hydroxyphenyl)-propionate.

If a plasticiser is present, the ratio thereof to PHA may be up to 40 phr w/w and the range 5–20 especially 6–12, phr w/w is generally suitable.

Examples of suitable plasticisers are high-boiling esters of polybasic acids, such as phthalates, isophthalates, citrates, fumarates, glutarates, phosphates or phosphites. The esterified radicals may be for example $C_1$–$C_{12}$ alkyl, aryl, aralkyl or aralkyl. Particular examples are dialkyl, for example dioctyl, phthalates, and dialkylalkylene oxide glutarates high-boiling esters and partial esters of polyhydric alcohols, especially glycols, polyglycols and glycerol. The acid-derived radical of the ester typically contains 2–10 carbon atoms. Examples are triacetin, diacetin and glycerol dibenzoate and aromatic sulphonamides such as paratoluenesulphonamide Particular examples of such plasticisers are esters of polyhydric alcohols, for example glyceryl esters of $C_1$–$C_4$ carboxylic acids, especially Estaflex (Tradename). Generally it is preferred that the plasticiser should be biodegradable.

Additional optional additives include colorants such as titanium dioxide, and fillers such as talc and clay. These may be present in small amounts usually 0–20%, preferably 5 to 20%.

Particularly preferred PHA adhesive compositions comprise 50–95% PHA, 0–20% of plasticiser, 0–1% of nucleant, 0–20% of tackifier, 0–4% of stabiliser or antioxidant, 0–10% of wax diluent, and 0–20% of a colorant and/or filler.

PHA adhesive formulations can be, for example, granules, dry powder or preferably latex suspensions. In such formulations the PHA is in particulate form before the setting treatment. The adhesive layer may be at least partly discontinuous after the setting treatment. Granules may be formed by a normal extrusion process, using for example, a single or twin screw extruder in which the PHA powder is melted and passed through a die before cutting into granules.

Amorphous PHA tends to crystallise with time and it may be supplied as an aqueous suspension or latex, in which the average particle size is from 0.1 µm to 2.0 µm and preferably from 1.0 µm to 2.0 µm.

Suitable latices can be produced in known processes for producing PHA, particularly polymers of hydroxybutyric acid and copolymers thereof with hydroxyvaleric acid, in which microorganisms are grown under conditions such that they accumulate PHA and are then treated to break their cellular structure and to release particles of PHA into an aqueous suspension. This can be accomplished for example by heat treatment and/or digestion with enzymes. Organic matter other than PHA is preferably largely removed, for example by separating the PHA from the liquid, preferably in the presence of a surfactant.

The PHA may be resuspended in water to provide a suitable latex for use as an adhesive. Suitable latices and methods of their production are described in European Patent 145,233. Those containing peptidoglycan as the major non-PHA cell material may be used. The peptidoglycan is believed to be present as a layer surrounding the substantially amorphous PHA particles. It need not be completely removed as it tends to isolate the particles from surrounding materials which may induce crystallisation. The latex may be stabilised with a surfactant.

The process of the present invention may be carried out without heating if a latex is used. If powder or granules are used heating is usually necessary. The adhesive composition is placed between the two articles in the cold state, preferably at a temperature from 15° C. to 50° C., especially 15° C. to 35° C. Then the articles are subjected to pressure and optionally a heat treatment to set the adhesive. Typically the pressure is applied in the range 500 to 2000 and up to 10000 psig (34.5 to 690 bar), especially 500 to 8000 psig (34.5 to 550 bar) for setting at the "cold" temperatures mentioned above. Typically the heat treatment if used is in the range 120 to 190, especially 130° to 190,° C.: pressures up to 2000 psig (138 bar) are then usually sufficient.

The adhesives of the present invention are useful for a wide range of applications. Of particular interest are sealing operations for example, in packaging and carton sealing, in sanitary napkins, disposable baby napkins and hospital equipment, etc. The adhesives are useful for disposable articles in which at least one flexible film material is bonded to at least one tissue, non-woven, polyolefin or other flexible polymeric film substrate. Alternately, the adhesive may bond elastic to polyethylene, polypropylene or a non-woven substrate.

The adhesive composition when set does not necessarily have to provide a permanent or strong bond in order to satisfy the requirements of a particular bonded article. In some cases it may be advantageous for the bond to be weak enough to enable the articles to be peeled apart. The adhesive layer contains PHA typically at 0.1 to 10.0 $g/dm^2$.

Latex suspensions may be used in the absence of nucleants, tackifiers, stabilisers, antioxidants, plasticisers, colorants and fillers if desired.

The following examples illustrate the invention but do not in anyway limit the scope of the invention.

Latex suspension preparation

A sample of fermentation broth from a culture producing PHBV (11% mol HV) was heat shocked to break open the cells and treated with a proteolytic enzyme followed by a water wash regime as described in EP-A-145 233. At this stage in the preparation a sample of latex suspension was taken for use in the present invention. The molecular weight of the PHBV in the latex suspension was 527,000.

Granule preparation

PHBV dry powder (24% mol HV) prepared by methods known in the art (available from ZENECA Bioproducts, PO Box 2, Belasis Avenue, Billingham, Cleveland, TS23 1YN, UK) was used to prepare PHBV granules (24% mol HV) containing 10 phr triacetin and 1 phr boron nitride. The granules were prepared by extrusion at a die temperature of 155° C. (maximum). The molecular weight of the PHBV in the granules was 294,500.

Materials Specification

Paper=76.02 $g/m^2$

Aluminium Foil=33.81 $g/m^2$

PHB-Film=72.94 $g/m^2$

Card=340 to 550 $g/m^2$

Sample preparation

Latex suspension adhesive (no heat treatment)

Strips (10 cm×2 cm) of a range of materials were cut. Latex solution (40% w/w of PHA; 1 ml) was pipetted on to the first test material. A second test material was overlaid on the first with a 5 cm overlap and then the combined test sample was put between two pieces of MELINEX (trade mark) film and placed between two plates in a press at room temperature (20° C.). The plates were adjusted until they touched the test sample and then pressure was applied to 5 tonnes (490 bar) and held for 1 minute. The pressure was released and the sample removed from the plates. The samples were cut into 2 cm wide strips.

Latex suspension adhesive—(heat treatment)

Strips of a range of materials to be tested were cut into 20 cm×9 cm strips. Latex suspension (1 ml) was pipetted on to an area in the centre of the first strip of test material with a 5 cm overlap. The second strip of test material was overlaid on top of the first strip of test material. Then the combined test sample was put between two pieces of "MELINEX" (trade mark) film and placed between two plates in a press. The press temperature was set to either 190° C. or 134° C. Pressure was applied to 5 tomes (109 bar) and held for 1 minute. The sample was removed quickly and allowed to cool. When completely cold the samples were cut into 2 cm wide strips.

Granule adhesive—(heat treatment)

Strips (20 cm×9 cm) of the materials to be tested were cut. One piece of test material was laid on a press with "MELINEX" (trade mark) film between it and the plate. Between 1.5 g and 1.8 g of granules were placed in the intended 5 cm overlap area and the second test material was laid on top of the first test material. "MELINEX" (trade mark) film was placed between the second test material and the second plate. The plates with the test sample between were transferred to a press at 190° C. or 134° C. The pressure was increased to 5 tomes (109 bar) and held for 1 minute at 190° C. or 45 seconds at 134° C. The sample was then removed from the press and cooled. When completely cool the samples were cut into 2 cm wide strips.

Peel test for adhesive strength

All the samples were tested for the strength of the adhesive bond using an Instron 1122C mechanical test machine at a 90 degree peel angle, speed 10 mm per minute and at a temperature of 23° C. The bond strength is presented according to the following scale:

|  | Gic $(Nm^{-2})$ |
|---|---|
| VERY POOR | less than 1 |
| POOR | between 1 and 10 |
| LOW | between 10 and 100 |
| GOOD | between 100 and 500 |
| VERY GOOD | over 500 | in which Gic $(Nm^{-2})$ is (force÷width)×(1−cos Q) where Q is the peel angle. The results are presented in Table 1.

TABLE 1

| SPECIMEN | | ADHESIVE | TEMP | BOND |
|---|---|---|---|---|
| BASE | TOP | TYPE | °C. | STRENGTH |
| PAPER | PAPER | LATEX | 20 | LOW |
| PAPER | PAPER | LATEX | 190 | GOOD |
| PAPER | Al-FOIL | LATEX | 20 | POOR |
| PAPER | Al-FOIL | LATEX | 190 | POOR |
| PAPER | PHB-FILM | LATEX | 134 | GOOD |
| CARD | PAPER | LATEX | 20 | POOR |
| CARD | PAPER | LATEX | 190 | GOOD |
| Al-FOIL | Al-FOIL | LATEX | 190 | LOW |
| PHB-FILM | PHB-FILM | LATEX | 20 | POOR |
| PHB-FILM | PHB-FILM | LATEX | 134 | V GOOD |
| CARD | PHB-FILM | LATEX | 20 | POOR |
| CARD | PHB-FILM | LATEX | 134 | GOOD |
| CARD | CARD | LATEX | 20 | V POOR |
| CARD | CARD | LATEX | 190 | GOOD |
| PAPER | PAPER | GRANULE | 190 | GOOD |
| PAPER | PAPER | GRANULE | 134 | GOOD |
| PAPER | Al-FOIL | GRANULE | 134 | POOR |
| PAPER | PHB-FILM | GRANULE | 134 | GOOD |
| CARD | PAPER | GRANULE | 134 | GOOD |
| Al-FOIL | Al-FOIL | GRANULE | 190 | POOR |
| Al-FOIL | Al-FOIL | GRANULE | 134 | POOR |
| Al-FOIL | PHB-FILM | GRANULE | 134 | POOR |
| CARD | Al-FOIL | GRANULE | 134 | POOR |
| CARD | PHB-FILM | GRANULE | 134 | GOOD |
| CARD | CARD | GRANULE | 190 | GOOD |
| CARD | CARD | GRANULE | 134 | GOOD |

I claim:

1. A process of bonding two or more articles together using an adhesive composition comprising at least one polyhydroxyalkanoate (PHA) wherein the PHA is applied to one or more of the articles as a latex of particles of PHA in water, placed between the articles to be bonded and the articles are subjected to pressure to set the adhesive, said PHA being a polymer or copolymer of hydroxybutyric acid.

2. A process of bonding two or more articles together using an adhesive composition comprising at least one polyhydroxyalkanoate (PHA) wherein the PHA is applied to one or more of the articles as a latex of particles of PHA in water, placed between the articles to be bonded and the articles are subjected to pressure to set the adhesive, said PHA comprising the recurring unit —O—$C_mH_n$—CO— wherein m is 1–13 and n is 2 m.

3. A process as claimed in claim 1 in which the PHA is a copolymer of hydroxybutyric acid and hydroxyvaleric acid.

4. A process as claimed in claim 3 in which the content of hydroxyvaleric units in the copolymer is in the range 10 to 28 mol percent.

5. A process as claimed in claim 1 in which the PHA is derived from a microorganism.

6. A process as claimed in claim 1 which is carried out without heating and the pressure is in the range 34.5% to 690 bar.

7. A process as claimed in claim 1 in which a nucleant, tackifier, plasticiser, antioxidant, stabiliser, colorant or filler is present.

* * * * *